United States Patent [19]

Fukui et al.

[11] Patent Number: 5,671,714

[45] Date of Patent: Sep. 30, 1997

[54] APPARATUS FOR CONTROLLING OPERATION TIMING OF INTERNAL COMBUSTION ENGINE

[75] Inventors: Wataru Fukui; Yasukazu Koezuka, both of Tokyo, Japan

[73] Assignee: Mitsubishi Denki Kabushiki Kaisha, Tokyo, Japan

[21] Appl. No.: 604,457

[22] Filed: Feb. 21, 1996

[30] Foreign Application Priority Data

Apr. 21, 1995 [JP] Japan ................................ 7-096806

[51] Int. Cl.$^6$ ........................... F02P 5/15; F02P 7/067
[52] U.S. Cl. ................................ 123/414; 123/643
[58] Field of Search ................ 123/414, 494, 123/617, 643

[56] References Cited

U.S. PATENT DOCUMENTS 5,060,614  10/1991  Uchimi et al. ............. 123/414
5,329,904   7/1994  Kokubo et al. ............ 123/414

FOREIGN PATENT DOCUMENTS 4037546  5/1991  Germany.
4005123  8/1991  Germany.
3-168346  7/1991  Japan.

OTHER PUBLICATIONS

German Journal: Krebs, S.: "Advanced Engine Management Systems: The Key to Reduced Emissions and Improved Performance." In: Siemens Review, R&D Special 1993, pp. 14–17.

*Primary Examiner*—Tony M. Argenbright
*Attorney, Agent, or Firm*—Sughrue, Mion, Zinn, Macpeak and Seas

[57] ABSTRACT

An engine control apparatus for an internal combustion engine capable of rapidly and easily identifying engine cylinders with high accuracy, while ensuring a backup control upon occurrence of an abnormality. The control apparatus includes a first signal detector provided in association with a crank shaft for obtaining a first signal series, a second signal detector provided in association with a cam shaft for obtaining a second signal series, and a controller for controlling a parameter involved in engine operation on the basis of each signal series. The first signal series includes an angular position signal and level intervals corresponding to cylinder groups, while the second signal series includes cylinder identifying signal pulses. The pulse identifying a given cylinder has a form which differs from those for the other cylinders. The controller includes a level interval detector for detecting the level intervals on the basis of the first signal series, a reference position detector for detecting reference positions for the individual cylinders on the basis of the first signal series, a cylinder group identifier for identifying groups each comprised of cylinders controlled simultaneously, a cylinder identifier for identifying the cylinders on the basis of the second signal series, a calculator for arithmetically determining control timings for controlling the parameter on the basis of the results of the cylinder identification and the second signal series, and an abnormality detector for detecting occurrence of abnormality in one of the signal series.

12 Claims, 7 Drawing Sheets

APPARATUS FOR CONTROLLING OPERATION TIMING OF INTERNAL COMBUSTION ENGINE

BACKGROUND OF THE INVENTION

1. Field of the Invention

The present invention generally relates to a control apparatus for controlling operation timing of an internal combustion engine by identifying reference positions of individual engine cylinders, respectively. More particularly, the invention is concerned with a control apparatus for an internal combustion engine which can rapidly perform cylinder identification to be reflected onto the timing control and which has a relatively simplified structure while deriving a reference position signal relating to a crank shaft with high reliability to thereby ensure an enhanced accuracy for the timing control. This apparatus is capable of carrying out a backup control of the internal combustion engine even in the case where an angular position signal containing the reference position signal or the cylinder identifying signal can not be obtained.

2. Description of Related Art

Generally, in a control system for an internal combustion engine (hereinafter also referred to simply as the engine), there are employed a reference position signal and a cylinder identifying signal generated in synchronism with rotation of the engine with a view to controlling the ignition timing, quantity of fuel to be injected into the engine and others. Usually, the signal generator for generating these signals is mounted on a cam shaft of the engine in correspondence to the engine cylinders, respectively, for detecting indirectly rotational or angular positions of a crank shaft.

For having better understanding of the present invention, technical background thereof will be described in some detail. FIG. 8 is a perspective view showing a mechanical structure of a rotation signal generator employed in a hitherto known engine control apparatus, and FIG. 9 is a circuit diagram showing an electric signal processing circuit provided in association with the structure shown in FIG. 8, both of which are described in Japanese Unexamined Patent Application Publication No. 68252/1994 (JP-A-6-68252). Parenthetically, the internal combustion engine of concern is assumed to be a six-cylinder engine.

Referring to the figures, a cam shaft 1 is driven at a speed equal to a half of the rotation speed (rpm) of a crank shaft (not shown) so that the control timings for all the six cylinders can be covered by a single rotation of the cam shaft 1.

A rotating disk 2 secured integrally to the cam shaft 1 so as to corotate therewith is formed with a series of radial slits 3a in an outer peripheral portion thereof with equal angular distance therebetween for generating an angular position signal POS composed of a series of pulses generated at every predetermined angle during rotation of the rotating disk 2 and a number of windows 3b for generating reference position signal pulses REF in one-to-one correspondence to the engine cylinders, respectively.

Light emission diodes (LEDs) 4a and 4b are disposed fixedly at a position facing a circular array of the slits 3a and a position facing a circular array of the windows 3b, respectively. Further, photodiodes 5a and 5b are disposed in opposition to the light emission diodes 4a and 4b, respectively, with the rotating disk 2 being interposed therebetween, wherein the light emission diodes 4a, 4b and photodiodes 5a, 5b cooperate to constitute photocouplers, respectively.

Referring to FIG. 9, there are provided amplifier circuits 6a and 6b connected to output terminals of the photodiodes 5a and 5b, respectively, and output transistors 7a and 7b connected to the output terminals of the amplifier circuits 6a and 6b, respectively.

The rotating disk 2, the photocouplers (4a; 5a) and (4b; 5b), the amplifier circuits 6a and 6b and the output transistors 7a and 7b constitute a rotation signal generator 8 for generating the angular position signal POS and the reference position signal REF.

FIG. 10 is a block diagram showing an engine control system known heretofore. Referring to the figure, the angular position signal POS and the reference position signal REF outputted from the rotation signal generator 8 are supplied to a microcomputer 10 by way of an interface circuit 9 to be utilized for controlling the ignition timing, the fuel injection quantity and other parameters for the engine.

FIG. 11 is a waveform diagram for illustrating the angular position signal POS and the reference position signal REF outputted from the rotation signal generator 8.

Referring to FIG. 11, the angular position signal POS is comprised of a series of pulses generated in correspondence to the slits 5a, respectively, formed in the rotating disk 2, wherein the pulses of the angular position signal POS are generated, for example, at every crank angle of 1°. Thus, the angular position signal POS can be used for measuring, for example, the angular position of the crank shaft. On the other hand, the reference position signal REF has a pulse sequence repeated upon every rotation of the crank shaft over a crank angle of 720°. More specifically, the pulse sequence of the reference position signal REF includes six pulses each rising up at a predetermined angle in correspondence to each of the engine cylinders, wherein the six pulses have respective pulse widths which differ from one to another engine cylinder so that they can be used as the cylinder identifying signal pulses, respectively.

The conventional engine control apparatus described above by reference to FIGS. 8 to 10 can discriminatively identify the individual engine cylinders and the reference positions (crank angles) on the basis of the angular position signal POS and the reference position signal REF for effectuating optimal control of the ignition timing, the fuel injection quantity and other parameters in dependence on the engine operation states.

At this juncture, it is noted that the cam shaft 1 is driven from the crank shaft by way of a transmission mechanism such as a transmission belt/pulley mechanism (not shown). Accordingly, there may arise a phase difference in rotation between the cam shaft and the crank shaft, although it depends on the engine operation states. As a result of this, the angular positions indicated by the angular position signal POS and the reference position signal REF generated by the rotation signal generator 8 may undesirably be deviated or offset from the intrinsic or actual crank angle. When the engine operation control is performed on the basis of the signal suffering such phase deviation, the control of the ignition timing and other will naturally be accompanied with corresponding deviation, whereby it may become impossible to obtain the engine operation performance as intended.

To cope with the problem mentioned above, there has already been proposed such an apparatus which is so implemented as to generate the angular position signal POS and the reference position signal REF with high accuracy in association with the crank shaft while generating only the cylinder identifying signal pulses bearing one-to-one correspondence to the individual engine cylinders, respectively, in association with the cam shaft 1, as is disclosed, for example, in Japanese Unexamined Patent Application Publication No. 68252/1994 (JP-A-6-68252).

However, the engine control apparatus disclosed in the above publication suffers shortcomings in that the sensor as well as peripheral devices thereof provided in association with the crank shaft for generating the angular position signal POS and the reference position signal REF is much complicated and expensive and that a great difficulty is encountered in realizing a backup control in the case where either one of the angular position signal POS or the reference position signal REF becomes unavailable due to occurrence of abnormality or fault in the sensors provided in association with the crank shaft or when the cylinder identifying signal can not be obtained due to occurrence of abnormality or defect in the sensor provided in association with the cam shaft 1, incurring possibly shutdown of the engine operation.

As is apparent from the foregoing, the engine control apparatus known heretofore suffers a problem that the detection accuracy of the angular position signal POS and the reference position signal REF is impaired when the rotation signal generator 8 is provided in association with the cam shaft 1 because of possibility of the phase difference in rotation between the rotation signal generator 8 and the crank shaft, as a result of which deviation or error is involved in the control of the ignition timing and other functions, presenting a great obstacle in realizing the engine performance as intended.

On the other hand, in the case of the engine control apparatus such as disclosed in Japanese Unexamined Patent Application Publication No. 68252/1994 (JP-A-6-68252) where the angular position signal POS and the reference position signal REF are generated by the sensor device provided in association with the crank shaft, while the cylinder identifying signal is generated by the detecting means provided in association with the cam shaft, there arises problems that the sensor and peripheral devices provided in association with the crank shaft are much complicated and that the backup control can not be carried in the case where the angular position signal POS, the reference position signal REF or the cylinder identifying signal becomes unavailable due to occurrence of fault in the associated detection system.

SUMMARY OF THE INVENTION

In the light of the state of the art described above, it is an object of the present invention to provide an engine control apparatus which is capable of performing rapidly engine cylinder identification to be reflected to the timing control of the engine with high accuracy and reliability and which can be implemented inexpensively in a relatively simplified structure.

It is another object of the present invention to provide an engine control apparatus which is capable of performing a backup control even in the case where a first signal series (angular position signal containing level intervals corresponding to reference positions) or a second signal series (cylinder identifying signal) is not available due to occurrence of a fault in the relevant detecting systems.

In view of the above and other objects which will become apparent as the description proceeds, there is provided according to a general aspect of the present invention an apparatus for controlling operation of an internal combustion engine, which apparatus includes a first signal detecting means for generating a first signal series in synchronism with rotation of a crank shaft of the internal combustion engine, a second signal detecting means for generating a second signal series in synchronism with rotation of a cam shaft driven with a speed reduction ratio of "½" relative to the crank shaft, and a control means for controlling parameter or parameters involved in operation of the internal combustion engine on the basis of at least one of the first and second signal series mentioned above. The first signal series includes an angular position signal generated at every predetermined angular position of the crank shaft, a first level interval corresponding to a reference position of a specific cylinder group of the engine and a second level interval corresponding to a reference position of other cylinder group and having a polarity differing from that of the first level interval. The second signal series is formed by pulses corresponding to the individual engine cylinders, respectively, and contains a cylinder identifying signal for at least a given one of the cylinders, wherein a pulse form of the cylinder identifying signal for a given or specific one of the engine cylinders differs from those for the other engine cylinders. The control means which may be constituted by a microcomputer or microprocessor includes a level interval detecting means for detecting the first and second level intervals on the basis of the first signal series, a reference position detecting means for detecting reference positions of the engine cylinders, respectively, on the basis of the angular position signal and the first and second level intervals, a cylinder group identifying means for identifying the cylinder groups on the basis of the first and second level intervals, a cylinder identifying means for discriminatively identifying each of the engine cylinders on the basis of at least the second signal series, and a control timing arithmetic means for arithmetically determining control timings for controlling the parameter(s) on the basis of the results of the cylinder identification performed by the cylinder identifying means and the second signal series.

By providing the first detecting means for detecting the first signal series (the angular position signal containing the reference positions for the cylinder groups, respectively,) in association with the crank shaft as described above, it is possible to enhance the accuracy of the timings for controlling the operation of the internal combustion engine. Furthermore, by providing the second detecting means for detecting the second signal series (cylinder identifying signal) in association with the cam shaft, the cylinder identification can easily and reliably be realized. Besides, by combination of the cylinder identifying signal, the angular position signal and the level intervals, the cylinder groups and the cylinders as well as the reference position can be identified speedily, whereby the result of the cylinder identification can be rapidly reflected onto the timing control of the internal combustion engine. In this conjunction, it should be noted that with the phrase "cylinder group", it is intended to mean a group consisting of those cylinders which can be controlled substantially simultaneously with each other. Furthermore, a backup control can be effected by using the cylinder identifying signals corresponding to the individual cylinders, respectively, so that the internal combustion engine performance can be ensured at least to a necessary minimum even in the case where the first signal series (cylinder identifying signal) is unavailable, as will be elucidated in more detail later on.

In a preferred mode for carrying out the invention, the cylinder identifying signal of the second signal series for identifying the specific or given one cylinder may be formed by a pulse having a phase overlapping that of the first level interval so that the cylinder identifying means can identify the specific or given one cylinder on the basis of a signal level of the second signal series at a time point at which the reference position indicated by the first level interval is detected.

Owing to the arrangement in which the phase of the cylinder identifying signal (second signal series) for the given or specific engine cylinder is overlapped to that of the first level interval, the given or specific cylinder can speedily be identified on the basis of the cylinder identification signal level upon detection of the reference position.

In another preferred mode for carrying out the invention, the control timing arithmetic means may be so designed as to arithmetically determine the control timing for the parameter by counting the pulses of the angular position signal.

By virtue of the arrangement mentioned above, the control timing can arithmetically be determined with high accuracy by counting the angular position signal pulses.

In yet another preferred mode for carrying out the invention, the first level interval may correspond to a low ("L") level interval during which the angular position signal is not generated continuously, while the second level interval is a high ("H") level interval during which the pulses of angular position signal are concatenated in continuation. In that case, terminal ends of the first and second level intervals may be so selected as to correspond to the reference positions of the individual cylinder groups, respectively.

By providing the low "L" interval corresponding to the specific cylinder group and the high "H" interval corresponding to the other cylinder group in the first signal series with the reference position for each of the cylinder groups being set at the time point at which the level intervals are terminated (the time point at which generation of the succeeding angular position signal is started), the cylinder groups as well as the reference positions can be identified speedily nevertheless of simplified hardware structure.

In still another preferred mode for realizing the control apparatus for an internal combustion engine according to the invention, the cylinder identifying signal contained in the second signal series may be so generated that the pulse edge of the cylinder identifying signal makes appearance within the first or second level interval contained in the first signal series, wherein the level interval detecting means may be so designed as to detect the first or second level interval on the basis of the level of the first signal series at the time point at which the pulse edge of the cylinder identifying signal makes appearance.

By virtue of the arrangement described above, the cylinder groups can discriminatively be identified speedily with the reference positions being rapidly detected, while the engine control apparatus can be implemented in a simplified structure.

In a further preferred mode for realizing the control apparatus according to the invention, the cylinder identifying signal may contain a pulse for identifying the specific or given one cylinder, wherein the pulse width of the pulse identifying the specific or given cylinder differs from those of the other pulses for identifying the other engine cylinders.

By setting the pulse width of the cylinder identifying signal for the given or specific engine cylinder so as to be different from those for the other cylinders, the engine cylinder identification can easily be accomplished.

In a yet further preferred mode for realizing the control apparatus according to the invention, the cylinder identifying signal may contain an additional pulse generated within a predetermined angle in the vicinity of the cylinder identifying signal pulse for identifying the specific or given one engine cylinder.

By generating the additional pulse in the vicinity of the cylinder identifying signal pulse for identifying the specific or given one cylinder, the cylinder identification can be carried out easily and rapidly.

In a still further preferred mode for realizing the control apparatus according to the invention, the cylinder identifying means may be so implemented as to measure a time interval during which the cylinder identifying signal is generated on the basis of a count value of the pulses contained in the angular position signal during that time interval, to thereby identify discriminatively the individual engine cylinders from one another on the basis of the results of the measurement.

By measuring the duration of the interval during which the cylinder identifying signal is generated by counting the angular position signal pulses, as mentioned above, the cylinder identification can be realized with high reliability.

In a further preferred mode for realizing the control apparatus according to the invention, the cylinder identifying means may be so arranged as to identify the individual engine cylinders on the basis of ratios of time intervals during which the cylinder identifying signals are generated, respectively.

By arithmetically determining the duty ratio of the cylinder identifying signal pulse, as mentioned above, the cylinder identification can be realized with high accuracy even when the first signal series can not be obtained, whereby the backup control can be realized with high accuracy and reliability.

In a still further preferred mode for realizing the control apparatus according to the invention, the first signal detector means may include a first rotating disk fixedly mounted on the crank shaft corotatably therewith, the first rotating disk having an outer peripheral edge formed with a number of teeth projecting radially outwardly with a pitch corresponding to the predetermined angle of the crank shaft, a non-toothed segment which extends along the outer periphery of the first rotating disk over a predetermined angular range and in which the teeth are absent, and a continuous protrusion segment formed substantially in diametrical opposition to the non-toothed segment over a predetermined angular range, the continuous protrusion segment having a height differing from that of the non-toothed segment as viewed in the radial direction of the rotating disk, and a first sensor means disposed stationarily in opposition to the outer peripheral edge of the rotating disk for detecting the teeth, the non-toothed segment and the continuous protrusion segment to thereby generate the first signal series containing the angular position signal, the first level interval and the second level interval, respectively. The second signal detector means may include a second rotating disk fixedly mounted on a cam shaft of the engine for corotation therewith, the cam shaft being operatively connected to the crank shaft by way of a transmission means having a reduction ratio of "½", the second rotating disk having an outer peripheral edge formed with a predetermined number of projections extending radially outwardly substantially with angular equi-distance therebetween, at least one of the projections having a length differing from that of the other projections as viewed in a circumferential direction of the second rotating disk, the predetermined number mentioned above being equal to a number of cylinders of the internal combustion engine, and a second sensor means disposed stationarily in opposition to the outer peripheral edge of the second rotating disk for detecting the radial projections to thereby generate the second signal series including the pulses, wherein the pulse for the given one cylinder is generated in response to detection of the projection having the different length or width.

In a yet further preferred mode for realizing the control apparatus according to the invention, position of a trailing edge of the non-toothed segment as viewed in a rotational direction of the first rotating disk may be so selected as to define the reference position for determining control timing for the specific cylinder group including the engine cylinders which can be ignited substantially simultaneously, while position of a trailing edge of the continuous protrusion segment as viewed in a rotational direction of the first rotating disk may be so selected as to define the reference position for determining the control timing for the other cylinder group including the engine cylinders which can be ignited substantially simultaneously.

According to another aspect of the invention, there is provided an apparatus for controlling operation of an internal combustion engine, which apparatus includes a first signal detecting means for generating a first signal series in synchronism with rotation of a crank shaft of the internal combustion engine, a second signal detecting means for generating a second signal series in synchronism with rotation of a cam shaft driven with a speed reduction ratio of "½" relative to the crank shaft, and a control means for controlling at least one parameter involved in operation of the internal combustion engine on the basis of at least one of the first and second signal series. The first signal series includes an angular position signal generated at every predetermined angular position of the crank shaft, a first level interval corresponding to a reference position of a specific cylinder group of the engine and a second level interval corresponding to a reference position of other cylinder group and having a polarity differing from that of the first level interval. The second signal series contains pulses corresponding to the cylinders, respectively, and a cylinder identifying signal for at least a given one of the cylinders, wherein a pulse form of the cylinder identifying signal for the given one cylinder differs from those for the other engine cylinders. The control means includes a level interval detecting means for detecting the first and second level intervals on the basis of the first signal series, a reference position detecting means for detecting reference positions of the engine cylinders, respectively, on the basis of the angular position signal and the first and second level intervals, a cylinder group identifying means for identifying the cylinder groups on the basis of the first and second level intervals, a cylinder identifying means for discriminatively identifying each of the engine cylinders on the basis of at least the second signal series, a control timing arithmetic means for arithmetically determining control timings for controlling the parameter(s) on the basis of the results of the cylinder identification performed by the cylinder identifying means and the second signal series, and an abnormality decision means for generating and outputting an abnormality decision signal to the cylinder identifying means, the cylinder group identifying means and the control timing arithmetic means upon detection of a failure in one of the first and second signal series.

In the control apparatus described above, such arrangement may be adopted that when occurrence of abnormality in the second signal series is detected by the abnormality decision means, the cylinder group identifying means responds to the output of the abnormality decision means for thereby identifying the specific cylinder group and the other cylinder group, respectively, on the basis of the level intervals detected by the level interval detecting means. Then, the control timing arithmetic means arithmetically determines the control timing for the specific and other cylinder groups on the basis of output of the cylinder group identifying means.

Further, when occurrence of abnormality in the first signal series is detected by the abnormality decision means, the cylinder identifying means may respond to the output of the abnormality decision means for thereby identifying the engine cylinders, respectively, on the basis of duty cycles of the pulses contained in the second signal series. Thus, the control timing arithmetic means arithmetically determines the control timings for the engine cylinders, respectively, on the basis of output of the cylinder identifying means.

With the arrangements described above, backup control functions for determining the control timing for sustaining operation of the internal combustion engine can be ensured even when abnormality should occurs in the first signal series (first detecting means) or the second signal series (second detecting means).

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
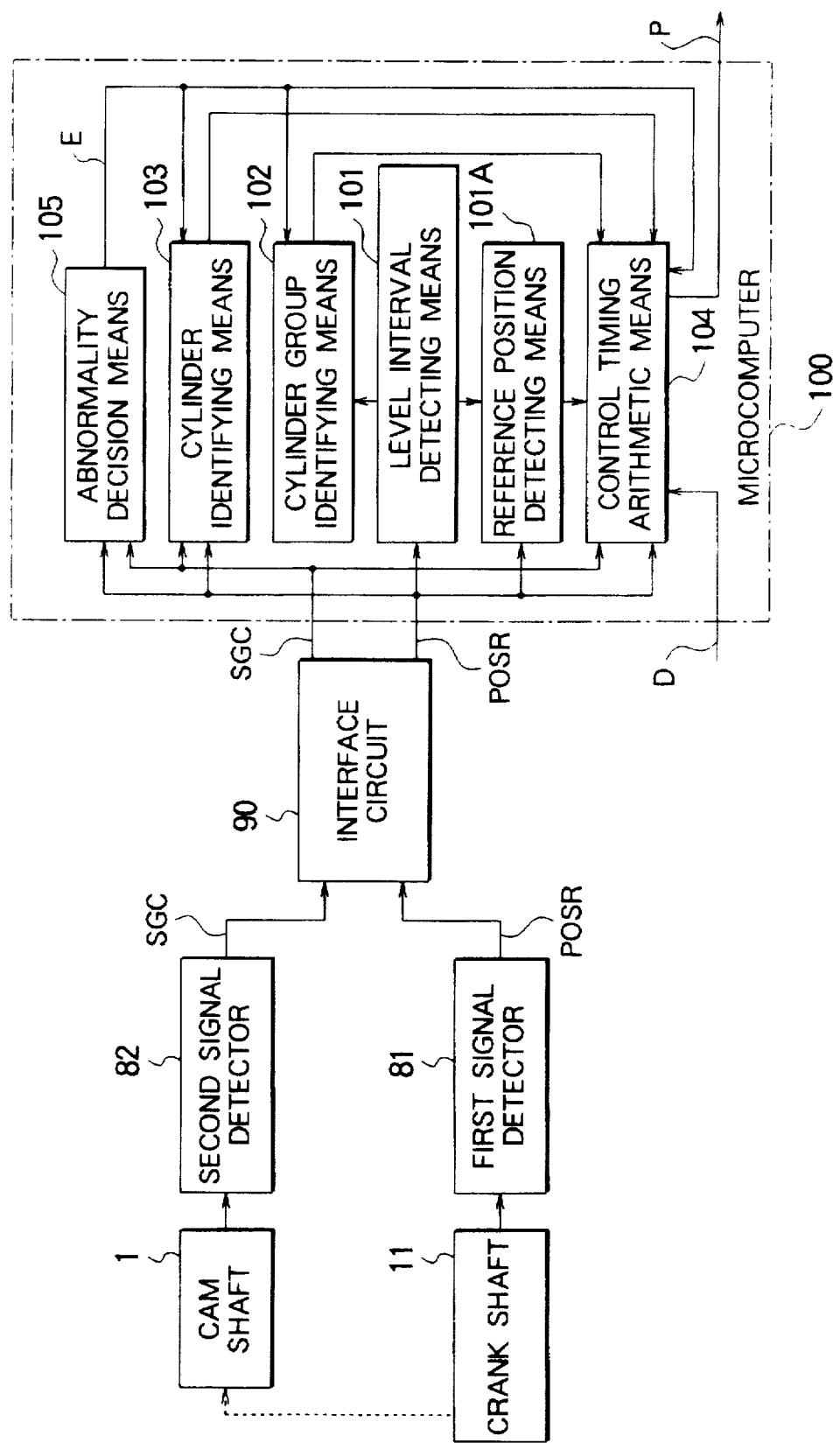
FIG. 1 is a functional block diagram showing schematically a general arrangement of an engine control apparatus according to a first embodiment of the invention.

In the following, the present invention will be described in detail in conjunction with what is presently considered as

9 preferred or typical embodiments thereof by reference to the drawings. In the following description, like reference characters designate like or corresponding parts throughout the several views.

Embodiment 1

Figure 2:
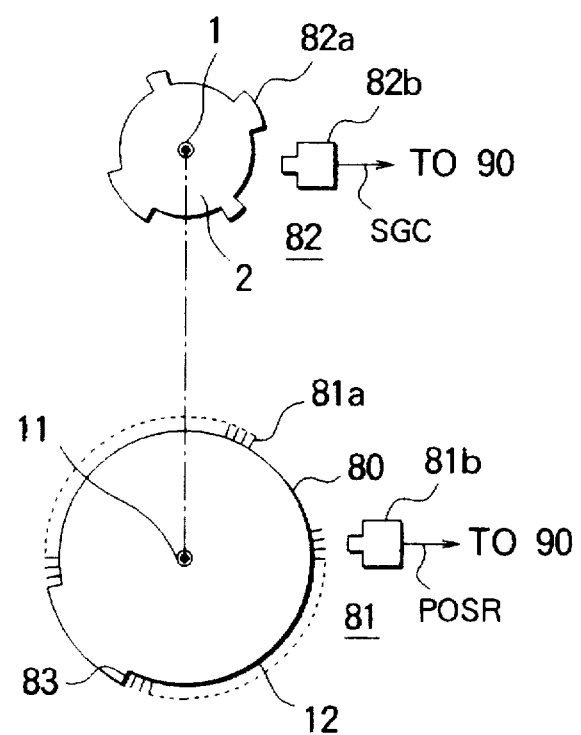
FIG. 2 is a view showing schematically structures of first and second signal detectors employed in the engine control apparatus according to the first embodiment of the invention.
Figure 3:
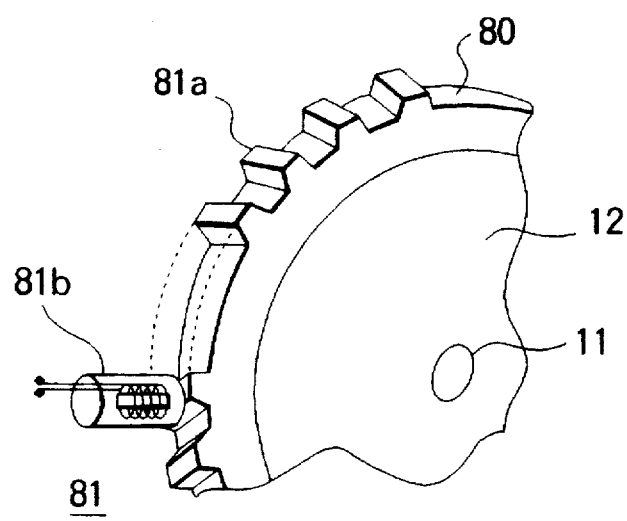
FIG. 3 is a fragmental perspective view showing exaggeratedly the first signal detector shown in FIG. 2.
Figure 4:
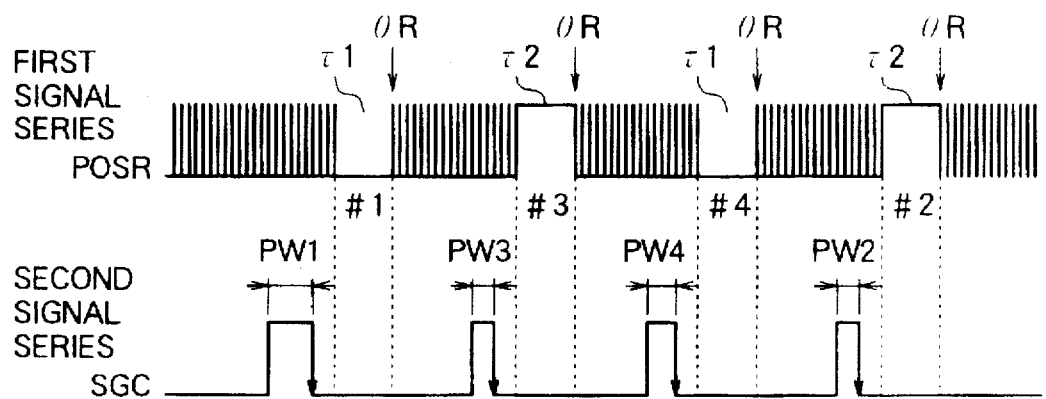
FIG. 4 is a waveform diagram for illustrating operation of the engine control apparatus according to the first embodiment of the present invention.

Now, the engine control apparatus according to a first embodiment of the present invention will be described by reference to FIGS. 1 to 4, wherein FIG. 1 is a functional block diagram showing schematically a general arrangement of the engine control apparatus according to the first embodiment of the invention, FIG. 2 is a view showing schematically structures of signal detectors employed in the engine control apparatus shown in FIG. 1, FIG. 3 is a fragmental perspective view showing exaggeratedly a first signal detector, and FIG. 4 is a waveform diagram for illustrating first and second signal series generated in the engine control apparatus according to the first embodiment of the invention.

Referring to FIG. 2, a cam shaft 1 is rotated in synchronism with a crank shaft 11 of an internal combustion engine by means of a transmission mechanism such as a belt drive mechanism with a speed reduction ratio of "½" relative to the crank shaft 11.

A first signal detector 81 designed to output a first signal series POSR in synchronism with the rotation of the crank shaft 11 is comprised of a rotating disk 12 mounted integrally on the crank shaft 11 so as to corotate therewith, a plurality of projections 81a formed in the rotating disk 12 around an outer peripheral edge thereof with a predetermined angular distance (e.g. for every crank angle in a range of 1° to 10°) and a sensor 81b which may be constituted by an electromagnetic pickup device, a Hall element, a magnetoresistance type sensor device or the like. In the case of the structure shown in FIG. 3, it is assumed, by way of an example only, that the sensor 81b is constituted by an electromagnetic pickup device.

Referring to FIG. 4, the first signal series POSR includes angular position signal pulses generated in response to the projections 81a, respectively, at every predetermined angular position of the crank shaft 11 in synchronism with the rotation thereof, a first level interval rl of "L" level corresponding to a reference position θR of a particular or specific cylinder group (including the cylinders #1 and #4 which can be controlled simultaneously) of the internal combustion engine, and a second level interval τ2 of "H"level (i.e., of polarity reverse to that of the first level interval τ1) corresponding to the other engine cylinder group (including the engine cylinders #3 and #2).

The first and second level intervals τ1 and τ2 are generated alternately at every crank angle of 180°. In this conjunction, it is presumed that the internal combustion engine to which the control apparatus according to the instant embodiment of the invention is applied incorporates four cylinders.

The angular position signal contained in the first signal series POSR includes a series of pulses which are generated in correspondence to the individual projections 81a formed in succession around the outer peripheral edge of the rotating disk 12, wherein in the circumferential row of the projections or teeth 81a formed in the outer peripheral edge of the rotating disk 12, there is provided for the purpose of generating a first level interval τ1 a non-toothed portion or segment 80 in which the projections or teeth 81a are absent in continuation over a predetermined angular range of ten to several ten degrees in terms of crank angle and in which the pulses of the angular position signal are not generated in

10 continuation. It is to be noted that the non-toothed portion or segment 80 is provided at one location of the outer peripheral edge of the rotating disk 12 mounted integrally on the crank shaft 11 (i.e., at every crank angle of 360°, wherein the position at which the non-toothed portion or segment 80 (and hence the first level interval τ1) is terminated (i.e., the position at which generation of the succeeding angular position signal pulses is started) corresponds to a reference position θR for the specific group of the cylinders.

Similarly, for the purpose of generating the second level interval τ2 over a crank angle ranging from ten to several ten degrees in the first signal series POSR, there is provided in the circumferential row of the projections or teeth 81a formed in the outer peripheral edge of the rotating disk 12, a continuous protrusion segment 83 in which the projections or teeth are concatenated to one another at one location (at every crank angle of 360°) in diametrical opposition to the non-toothed segment 80 mentioned above. It is to be noted that the position at which the continuous protrusion segment 83 (and hence the second level interval τ2) is terminated (i.e., the position at which generation of the succeeding angular position signal pulses is started) corresponds to a reference position θR for the other group of the cylinders.

On the other hand, provided in association with the cam shaft 1 so as to rotate in synchronism therewith is a second signal detector 82 for generating a second signal series SGC, wherein the second signal detector 82 is constituted by a rotating disk 2 mounted integrally on the cam shaft 1 for corotation therewith, a predetermined number of projections or teeth 82a formed in the rotating disk 2 around the outer peripheral edge in one-to-one correspondence to the engine cylinders, respectively, and a sensor 82b which may be constituted by an electromagnetic pickup device. As mentioned previously, it is assumed that the internal combustion engine now under consideration incorporates four cylinders. Accordingly, the number of the projections 82a is equal to four (refer to FIG. 2).

The second signal series SGC mentioned above is composed of cylinder identifying signal pulses (four pulses in the case of the instant embodiment of the invention) which are generated in correspondence to the individual engine cylinders, respectively, wherein the pulse corresponding to a given or specific one of the engine cylinders (e.g. the cylinder #1) has a pulse duration or width PW1 which is longer than the pulse widths PW2 to PW4 of the other cylinder identifying signal pulses.

The first signal series POSR and the second signal series SGC mentioned above are supplied to a microprocessor or microcomputer 100 by way of an interface circuit 90, as shown in FIG. 1.

The microcomputer 100 constitutes a control means for controlling parameters P involved in the control of operation of the internal combustion engine. To this end, the microcomputer 100 is comprised of a level interval detecting means 101 for detecting the first and second level intervals τ1 and τ2 relating to the cylinder groups, respectively, from the first signal series POSR, a reference position detecting means 101A for detecting the reference positions of the individual engine cylinders, respectively, on the basis of the angular position signal and the level interval signals τ1 and τ2 contained in the first signal series POSR, a cylinder group identifying means 102 for discriminatively identifying cylinder groups on the basis of the level interval signals τ1 and τ2 as detected, a cylinder identifying means 103 for identifying the individual cylinders on the basis of at least the second signal series SGC, a control timing arithmetic means 104 for arithmetically determining or calculating control timings for the engine operation parameter P on the basis of at least the result of cylinder identification performed by the cylinder identifying means and the second signal series SGC, and an abnormality decision means 105 for outputting an abnormality decision signal E to the cylinder identifying means 103, the cylinder group identifying means 102 and the control timing arithmetic means 104 upon detection of occurrence of a failure in at least one of the first signal series POSR and the second signal series SGC.

The cylinder identifying means 103 is designed to identify the individual engine cylinders on the basis of, for example, pulse duty ratio of second signal series SGC (cylinder identifying signal), while the control timing arithmetic means 104 is so arranged as to arithmetically determine the control timing for the control parameter P (for the ignition timing and others) by counting the pulses of the angular position signal contained in the second signal series SGC.

More specifically, When the engine system operates normally, the cylinder identifying means 103 measures the time intervals or periods during which the cylinder identifying signal pulses contained in the second signal series SGC are generated, respectively, by counting the angular position signal pulses contained in the first signal series POSR during the corresponding time intervals, respectively, to thereby identify discriminatively the individual engine cylinders on the basis of the results of the measurement. On the other hand, upon occurrence of abnormality (such as occurrence of unavailability or absence of the first signal series POSR), the cylinder identifying means 103 responds to the abnormality decision signal E issued by the abnormality decision means 105 to thereby discriminatively identify the specific or given cylinder and other engine cylinders on the basis of the result of the calculation of the ratio of the temporal duration of the cylinder identifying signal pulse (e.g. the duty ratio between the duration of "H" level and that of "L" level adjacent to each other) by using only the second signal series SGC. In this manner, a backup control can be realized.

Similarly, the control timing arithmetic means 104 arithmetically determines or calculates the control parameter P (control timings) by counting the angular position signal pulses contained in the first signal series POSR by making use of the reference position θR contained in the first signal series POSR as well as the cylinder identifying signal contained in the second signal series SGC, so long as the engine operation is normal. By contrast, upon occurrence of abnormality (e.g. in case the first signal series POSR can not be obtained), the control timing arithmetic means 104 responds to the abnormality decision signal E issued by the abnormality decision means 105 to thereby realize the backup control by relying on only the second signal series SGC. Furthermore, in the case where abnormality occurs in the second signal series SGC, the control timing arithmetic means 104 performs the backup control by simultaneously firing the engine cylinders belonging to the same group by making use of only the result of the cylinder group identification performed by the cylinder group identifying means 102 on the basis of the first signal series POSR.

Parenthetically, so long as the engine operation is normal, the control timing arithmetic means 104 arithmetically determines the control parameter P such as the ignition timing, the fuel injection quantity and others by reference to data stored in the form of a map in a memory (not shown) on the basis of operation state signals D supplied from a variety of sensors (not shown), to thereby control the individual engine cylinders in accordance with the control parameters P as determined.

Now, referring to FIG. 4, description will be made in more detail of operation of the engine control apparatus implemented in the structure shown in FIGS. 1 to 3 according to the first embodiment of the present invention.

As mentioned previously, the rotating disk 12 having the projections or teeth 81a formed for every predetermined angle as well as the non-toothed segment 80 and the continuous protrusion segment 83 corresponding to the cylinder groups, respectively, is mounted on the crank shaft 11 with the sensor 81b being disposed in opposition to the projections 81a, the non-toothed segment 80 and the continuous protrusion segment 83 to thereby constitute the first signal detector 81 for generating the first signal series POSR which contains the angular position signal pulse corresponding to the projections or teeth 81a, respectively, and the reference positions θR.

In this conjunction, it should be recalled that the row of the teeth 81a is partially provided with the non-toothed portion or segment 80 and the continuous protrusion segments 83 (at diametrically opposite locations, respectively, on the outer peripheral edge of the rotating disk 12 in the case of the four-cylinder engine) so that the first signal series POSR includes not only the angular position signal pulses but also the level intervals τ1 and τ2 indicating the reference positions θR in correspondence to the cylinder groups, respectively.

The non-toothed segment 80 and the continuous protrusion segment 83 are detected by the sensor 81b which transforms the presence/absence of the projections or teeth 81a into the first signal series POSR (electric signal pulses) to be inputted to the level interval detecting means 101 incorporated in the microcomputer 100, wherein the level intervals τ1 and τ2 are detected by the level interval detecting means 101 by comparing the intervals or periods in which the angular position signal pulses and the level interval indicating pulses are generated, respectively.

Thus, the first signal series POSR (refer to FIG. 4) generated upon rotation of the crank shaft 11 contains the angular position signals constituted by the pulses generated upon every predetermined angle (e.g. at every crank angle of 1°), in correspondence to the teeth 81a, respectively, the first level interval τ1 corresponding to the non-toothed segment 80 and the second level interval τ2 corresponding to the continuous protrusion segment 83, respectively, wherein the reference positions θR of the cylinder groups are indicated by the time points at which the first level interval τ1 and the second level interval τ2 are terminated, respectively.

At this juncture, it should be mentioned that the positions at which the level intervals τ1 and τ2 are terminated, respectively, (i.e., the positions at which generations of the succeeding angular position signals are started, respectively,) are employed in the arithmetic determination of the control timings for the cylinder groups, respectively.

More specifically, the cylinder group identifying means 102 is so arranged as to identify the specific cylinder group and the other cylinder group discriminatively from each other on the basis of only the level intervals τ1 and τ2 detected by the level interval detecting means 101. Thus, the control timing arithmetic means 104 can speedily identify the group of cylinders which can be fired simultaneously on a group-by-group basis. In this manner, the engine control performance can be ensured at least to a necessary minimum.

On the other hand, so long as the engine control apparatus operates normally, the reference positions θR detected by the reference position detecting means 101A are inputted to the control timing arithmetic means 104 together with the result of the cylinder identification performed by the cylinder identifying means 103 to be utilized for arithmetic determination of the control timings for the individual cylinders as performed on a cylinder-by-cylinder basis.

More specifically, in the second signal series SGC generated in correspondence to the projections 82a formed in the rotating disk 2 mounted on the cam shaft 1 contains the cylinder identifying signal pulses, wherein the pulse corresponding to the specific or given cylinder (i.e., the cylinder #1) is so set as to have the pulse width PW1 which is longer than the pulse widths PW2 to PW4 of the pulses corresponding to the other engine cylinders by forming the projection 82a corresponding to the specific cylinder longer than those for the other cylinders. Thus, the cylinder identifying means 103 can identify the specific cylinder and the other cylinders discriminatively, whereby the control timing arithmetic means 104 can realize a desired engine control performance on the basis of the result of the cylinder identification executed by the cylinder identifying means 103.

Of course, so long as the first signal series POSR and the second signal series SGC are obtained without failure, the cylinder identifying means 103 can discriminatively identify the specific engine cylinder as well as the other cylinders by measuring the pulse width of the second signal series SGC while counting the number of the angular position signal pulses contained in the first signal series POSR, as described previously.

Accordingly, the control timing arithmetic means 104 can identify the reference position $\theta R$ which succeeds to the cylinder identifying signal pulse having the maximum pulse width as the reference position for the given or specific cylinder, whereupon the reference positions $\theta R$ for other cylinders, respectively, can be identified successively to be used for the arithmetic determination of the control parameter P.

However, unless the first signal series POSR can be obtained normally due to a failure or defect of the sensor 81b provided in association with the crank shaft 11 (e.g. when the first signal series POSR continues to remain at a constant level or exhibits an abnormal pulse width), the abnormality decision means 105 generates the abnormality decision signal E which is then inputted to the cylinder group identifying means 102, the cylinder identifying means 103 and the control timing arithmetic means 104, as can be seen in FIG. 1.

In response, the cylinder identifying means 103 performs the engine cylinder identification on the basis of only the second signal series SGC, to thereby enable the backup control of the control parameter P of the internal combustion engine.

Specifically, the cylinder identifying means 103 performs calculation and comparison of the ratios between the "H"-level durations and the "L"-level durations of the pulses contained in the second signal series SGC sequentially to thereby identify the specific engine cylinder on the basis of the pulse having the greatest pulse width PW1 during which the second signal series SGC is at "H" level and then identifying the other cylinders successively.

In that case, by setting the timings at which the individual pulses of the second signal series SGC fall as the ignition timings for the individual cylinders, there can be ensured the internal combustion engine control performance required at least to a necessary minimum for the engine control.

Furthermore, when the second signal series SGC is not available due to a failure or defect of the sensor 82b provided in association with the cam shaft 1, the control timing arithmetic means 104 can perform the backup control by resorting to the groupwise simultaneous firing control on the basis of only the result of the cylinder group identification based on the level intervals $\tau 1$ and $\tau 2$ contained in the first signal series POSR. Thus, the engine control performance as required can be ensured at least to a necessary minimum.

As will now be appreciated, by providing the first signal detector 81 for detecting the first signal series POSR containing the angular position signal as well as the level intervals $\tau 1$ and $\tau 2$ (reference positions $\theta R$) in association with the crank shaft 11, there takes place no phase difference due to interposition of the transmission mechanism such as the belt drive mechanism. Thus, the crank angle and the reference position $\theta R$ can be detected with high accuracy, which in turn means that the ignition timings as well as the fuel injection quantity can be controlled with high accuracy.

Furthermore, owing to the setting of the different level intervals $\tau 1$ and $\tau 2$ for the cylinder groups, respectively, the specific cylinder group can be identified upon every detection of the reference position $\theta R$, whereby the group of the engine cylinders which can simultaneously be controlled can be detected rapidly and easily. Thus, the ignition timing control and the fuel injection control can be carried out rapidly and properly, which is advantageous in particular for starting the engine operation.

Additionally, even in the case where the first signal series POSR can not be obtained due to a fault of the first signal detector 81 or for any other reason, the backup function for the engine cylinder identification as well as for the reference position identification can be realized on the basis of the duty cycle of the pulses contained in the second signal series SGC, whereby the ignition timing control and the fuel injection control can continuously be sustained by the backup control.

Embodiment 2

In the case of the engine operation timing control apparatus according Go the first embodiment of the invention described above, the pulse width PW1 of the cylinder identifying signal for the given or specific cylinder #1 is made to differ from those of the cylinder identifying signals for the other engine cylinders, for thereby allowing the specific engine cylinder to be identified discriminatively from the others. However, such identification of the specific engine cylinder can be realized by making only the cylinder identifying signal pulse for the specific cylinder overlap the reference position $\theta R$ in the phase so that the specific cylinder can be identified on the basis of the level of the second signal series SGC at the reference position $\theta R$.

In that case, the second signal series (SGC) pulse assuming the "H" level at the reference position $\theta R$ identifies the reference position of the specific cylinder (cylinder #1) while the second signal series (SGC) pulses which are at "L" level at the reference positions $\theta R$ correspond to the reference positions for the other engine cylinders, respectively.

Thus, with the teachings of the present invention incarnated in the instant embodiment, the engine cylinder can be identified by referencing the level of the second signal series (SGC) pulses upon every detection of the reference position $\theta R$, thus rendering it unnecessary to measure the pulse width of the cylinder identifying signal. Accordingly, the individual engine cylinders can be identified speedily and easily, whereby the ignition timing control as well as the fuel injection control of the internal combustion engine can be effectuated optimally with high-speed response.

Embodiment 3

In the engine operation control apparatus according to a third embodiment of the invention, such arrangement is adopted that an additional pulse is generated in addition to the specific cylinder identifying signal pulse in the vicinity thereof within a predetermined angular range.

Figure 5:
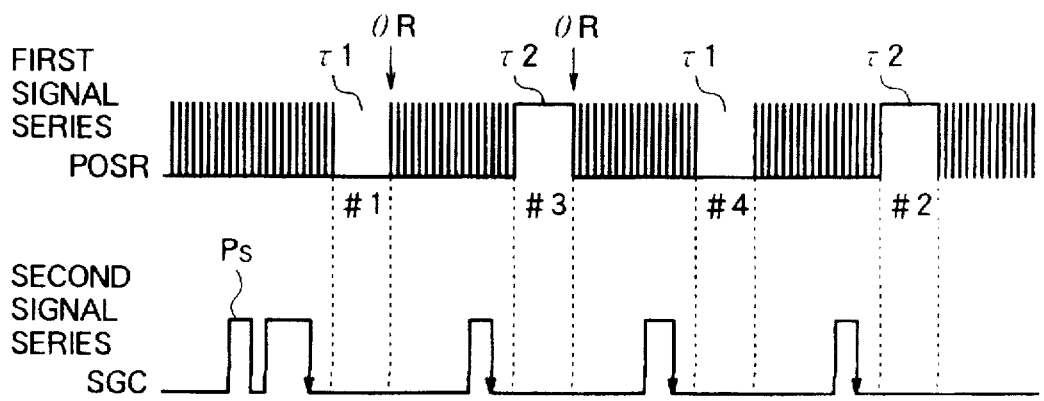
FIG. 5 is a waveform diagram for illustrating operation of an engine control apparatus according to a third embodiment of the invention.

FIG. 5 is a waveform diagram for illustrating operation of the engine control apparatus according to the instant embodiment of the invention in which an additional pulse Ps is generated in the vicinity of the specific engine cylinder identifying signal pulse.

Although it is shown that one additional pulse is generated immediately before the pulse for identifying the specific cylinder, it should be understood that such additional pulse may be inserted in succession to the specific cylinder identifying signal pulse. Furthermore, an arbitrary number of such additional pulses may be inserted.

With the second signal series SGC of the waveform shown in FIG. 5, the specific or given engine cylinder and other cylinders can discriminatively be identified rapidly by detecting presence or absence of the additional pulse Ps within a predetermined angular range in the vicinity of the intrinsic engine cylinder identifying signal pulse for the specific cylinder without need for measurement of the pulse width.

More specifically, so long as the first signal series POSR and the second signal series SGC are generated normally, it is possible to detect the additional pulse Ps generated within a predetermined angular range relative to the specific engine cylinder identifying pulse contained in the second signal series SGC by counting the angular position signal pulses contained in the first signal series POSR, as described previously.

On the other hand, when the first signal series POSR can not be obtained, existence of the additional pulse Ps within the predetermined angular range can discriminatively be detected through comparison of the duty ratios of the pulses contained in the second signal series SGC through the similar procedure as described previously.

Figure 6:
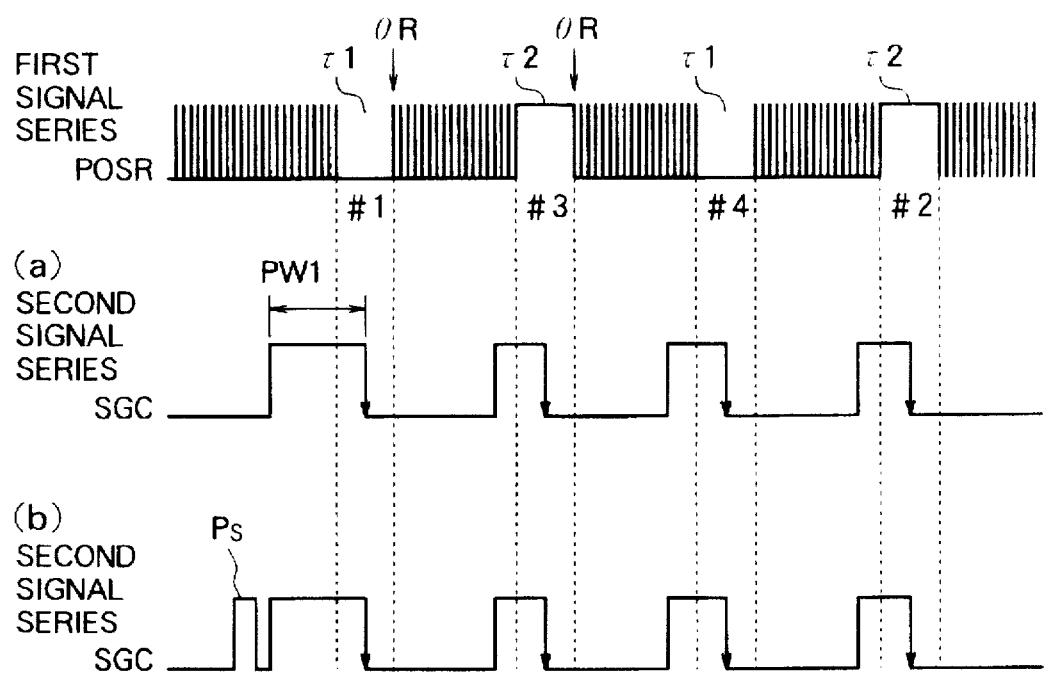
FIG. 6 is a waveform diagram for illustrating operation of an engine control apparatus according to a fourth embodiment of the invention.

In this way, the control timing arithmetic means 104 can perform without interruption the desired backup control by utilizing as the control timings the falling time points of the pulses contained in the second signal series SGC (the falling time points mentioned above coincide with one another for the individual engine cylinders, respectively, as indicated by arrows in FIG. 6) even when the first signal series POSR is not available.

Embodiment 4

In the case of the engine operation control apparatuses according to the preceding embodiments, the level interval detecting means 101 and the cylinder group identifying means 102 are so arranged as to identify the cylinder groups by detecting the level intervals τ1 and τ2 from the angular position signal on the basis of only the first signal series POSR. However, it is equally possible to identify the level intervals τ1 and τ2 and the cylinder groups by detecting the pulse edges of the pulses contained in the second signal series SGC.

FIG. 6 is a waveform diagram for illustrating operation of the engine control apparatus according to fourth embodiment of the invention. Referring to the figure, there are illustrated at (a) and (b), respectively, waveforms of the second signal series SGC which differ from each other. More specifically, there is illustrated at (a) in FIG. 6 a waveform of the second signal series SGC in which the pulse of the cylinder identifying signal for identifying the specific cylinder has a greater width, while illustrated at (b) is a waveform of the second signal series SGC in which an additional pulse Ps for identifying the specific cylinder is inserted immediately before the specific cylinder identifying pulse, wherein the falling edges of the individual cylinder identifying signal pulses are so set as to occur within the first level interval τ1 or second level interval τ2.

In this case, the level interval detecting means 101 checks the level of the first signal series POSR at time points at which the cylinder identifying pulses contained in the second signal series SGC are detected, respectively. When it is detected that the level of the first signal series POSR as detected is low or "L", then the first level interval τ1 can instantaneously be identified, while when the level of the first signal series POSR is high or "H", the second level interval τ2 can be identified instantaneously.

Similarly, the cylinder group identifying means 102 can determine at once whether the reference position θR detected in succession to each of the falling edges for the cylinder identifying signal pulses corresponds to the specific cylinder group or the other cylinder group.

By making use of the result of the identification described above, the control timing arithmetic means 104 can speedily perform the group-based simultaneous cylinder control, for example, upon starting of the engine.

Embodiment 5

In the engine operation control apparatuses according to the preceding embodiments of the present invention, the cylinder groups and the individual cylinders are discriminatively identified on the basis of the reference positions θR detected in succession to the falling edges of the cylinder identifying signal pulses. However, it is equally possible to identify the cylinder groups and the individual cylinder on the basis of the reference positions θR detected in succession to the rising edges of the cylinder identifying signal pulse.

Figure 7:
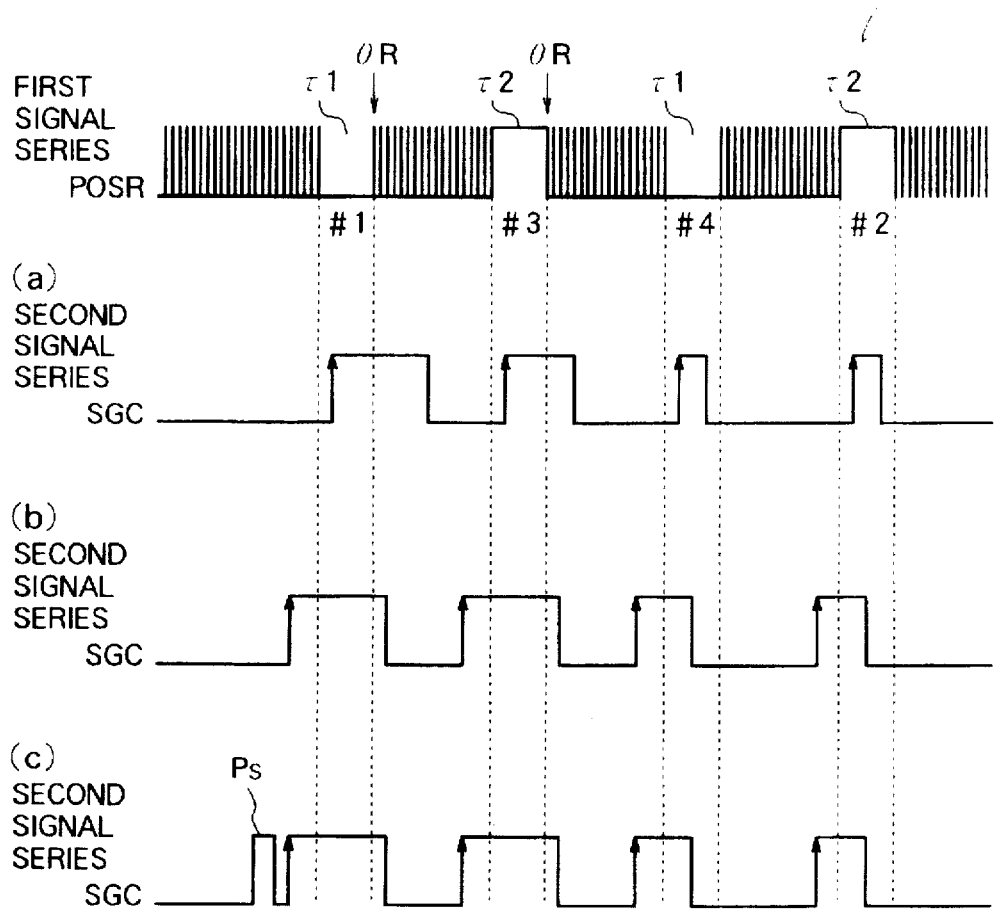
FIG. 7 is a waveform diagram for illustrating operation of an engine control apparatus according to a fifth embodiment of the invention.
Figure 8:
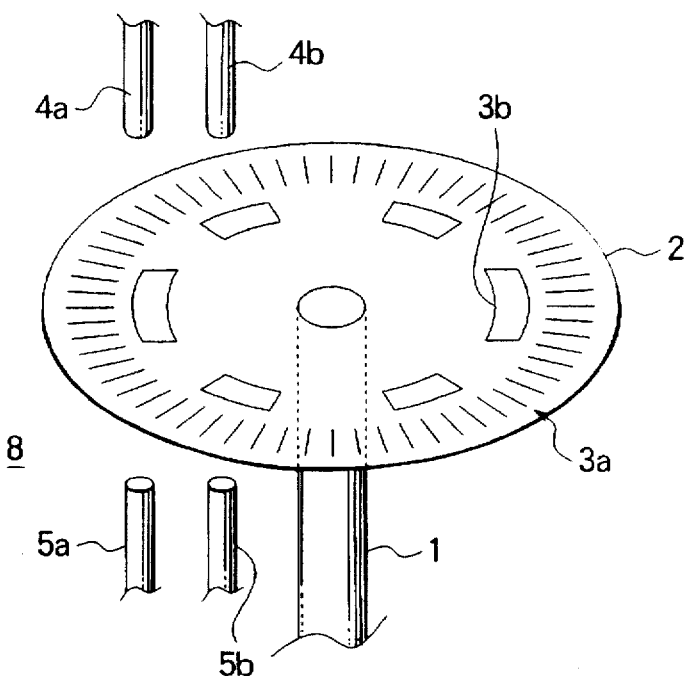
FIG. 8 is a perspective view showing a mechanical structure of a rotation signal generator employed in a hitherto known engine control apparatus.
Figure 9:
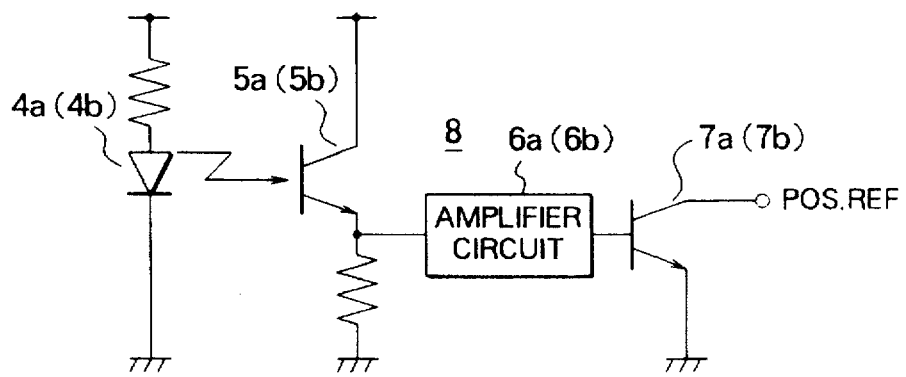
FIG. 9 is a circuit diagram showing an electric signal processing circuit of the rotation signal generator employed in the hitherto known engine control apparatus.
Figure 10:
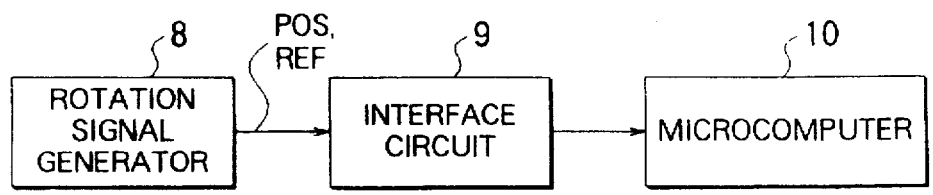
FIG. 10 is a block diagram showing a structure of the engine control apparatus known heretofore.
Figure 11:
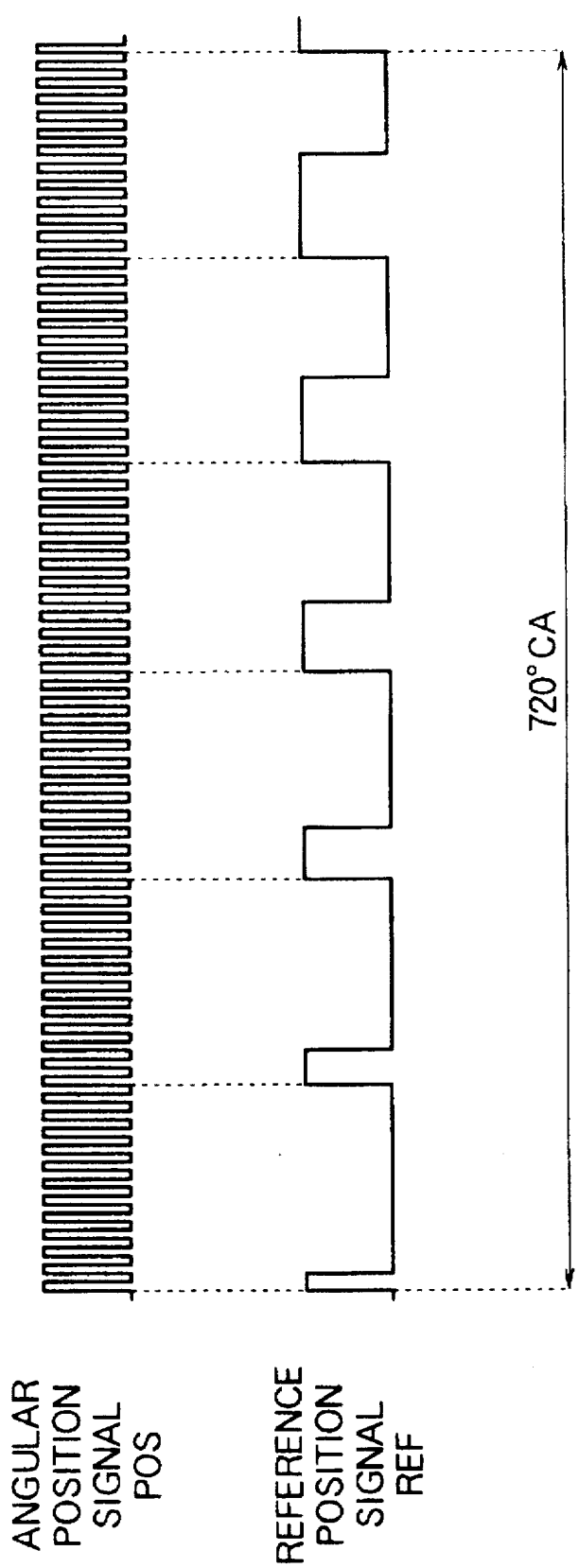
FIG. 11 is a waveform diagram for illustrating operation of the hitherto known engine control apparatus.

FIG. 7 is a waveform diagram for illustrating operation of the engine control apparatus according to a fifth embodiment of the invention which is so arranged as to identify the cylinder groups and the individual cylinders. More specifically, shown at (a) in FIG. 7 is a waveform for illustrating the control operation in the case where the rising edge of each of the engine cylinder identifying pulses occurs during the level interval τ1 or τ2, while shown at (b) is a waveform in which the rising edge of the each of the engine cylinder identifying signal pulses makes appearance outside of the intervals τ1 and τ2 and one of the pulses generated in correspondence to each cylinder group has a longer duration than that of the counterpart pulse. Further shown at (c) is a waveform for illustrating control operation in which an additional pulse Ps is inserted in the vicinity of the specific cylinder identifying signal pulse.

In each of FIGS. 7(a) to (c), the rising edges of the individual cylinder identifying signal pulses are so set as to make appearance at a same timing relative to the reference position θR so that they can be utilized for the backup control performed upon occurrence of failure in the first signal series POSR.

More specifically, referring to FIG. 7 at (a), upon detection of the rising edges of the cylinder identifying pulses, the cylinder groups can instantaneously be identified discriminatively by checking the level of the first signal series POSR.

On the other hand, in the cases illustrated at (b) and (c), the cylinder groups as well as the cylinders can identified at once on the basis of the reference positions θR detected in secession to the rising edges of the cylinder identifying signal pulses. In particular, in the case illustrated at (c), the specific cylinder can be detected positively owing to the presence of the additional pulse Ps, whereby reliability of the engine operation control apparatus can further be enhanced. In any case, the backup control as described can continuously be sustained even when any one of the first signal series POSR or the second signal series SGC suffers abnormality.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, the functions of the various means 101, 101A, 102, 103, 104 and 105 mentioned hereinbefore may be implemented softwarewise by preparing corresponding programs to be executed by a central processing unit (CPU) of the microcomputer 100 without departing from the scope of the invention. Further, the projections 82a of the rotating disk 2 may have lengths which differ from one to another for identifying the individual cylinders, respectively. Of course, the additional pulses Ps may be generated by forming a corresponding projections on the outer peripheral edge of the rotating disk 2. Additionally, although the invention has been described on the assumption that it is applied to a four-cylinder internal combustion engine, the basic concept of the invention may fined application to other type internal combustion engines. It goes without saying that an alarm function for indicating occurrence of abnormality upon detection thereof in the first or second signal series (POSR, SGC) may be incorporated. Furthermore, although it has been described that the pulse for identifying the specific or given one of the engine cylinders or cylinder groups has a longer duration than the other pulses, it may readily be appreciated that the identifying pulse has a shorter duration.

Accordingly, all suitable modifications and equivalents may be resorted to, falling within the spirit and scope of the invention.

What is claimed is:

1. An apparatus for controlling operation of an internal combustion engine, comprising:

first signal detecting means for generating a first signal series in synchronism with rotation of a crank shaft of said internal combustion engine;

second signal detecting means for generating a second signal series in synchronism with rotation of a cam shaft driven at a half speed relative to said crank shaft; and control means for controlling at least one parameter involved in operation of said internal combustion engine on the basis of at least one of said first and second signal series;

said first signal series including an angular position signal generated at every predetermined angular position of said crank shaft, a first level interval corresponding to a reference position of a specific cylinder group of said engine and a second level interval corresponding to a reference position of another cylinder group and having a polarity differing from that of said first level interval;

said second signal series containing pulses corresponding to said cylinders, respectively, and a cylinder identifying signal for identifying at least a given one of said cylinders, wherein a pulse form of said cylinder identifying signal for said given one cylinder differs from those for the other engine cylinders;

said control means including:

level interval detecting means for detecting said first and second level intervals on the basis of said first signal series;

reference position detecting means for detecting reference positions of said engine cylinders, respectively, on the basis of said angular position signal and said first and second level intervals;

cylinder group identifying means for identifying said cylinder groups on the basis of said first and second level intervals;

cylinder identifying means for discriminatively identifying each of said engine cylinders on the basis of at least said second signal series; and control timing arithmetic means for arithmetically determining control timings for controlling said at least one parameter on the basis of the results of the cylinder identification performed by said cylinder identifying means and said second signal series;

wherein said cylinder identifying signal contains an additional pulse generated within a predetermined angle in the vicinity of said cylinder identifying signal pulse for identifying said given one engine cylinder.

2. A control apparatus for an internal combustion engine according to claim 1, said cylinder identifying signal of said second signal series for identifying said given one cylinder being formed by a pulse having a phase overlapping that of said first level interval signal, wherein said cylinder identifying means identifies said given one cylinder on the basis of a signal level of said second signal series at a time point at which said reference position indicated by said first level interval is detected.

3. A control apparatus for an internal combustion engine according to claim 1, wherein said control timing arithmetic means is so arranged as to arithmetically determine the control timing for said at least one parameter by counting the pulses of said angular position signal.

4. A control apparatus for an internal combustion engine according to claim 1, wherein said first level interval corresponds to a low level interval during which said angular position signal is not generated continuously, while said second level interval is a high level interval during which pulses of said angular position signal are concatenated in continuation; and wherein terminal ends of said first and second level intervals are so selected as to correspond to the reference positions of said individual cylinder groups, respectively.

5. A control apparatus for an internal combustion engine according to claim 1, wherein said cylinder identifying signal contained in said second signal series is so generated that the pulse edge of the cylinder identifying signal occurs within said first or second level interval contained in said first signal series; and wherein said level interval detecting means is so designed as to detect said first or second level interval on the basis of the level of said first signal series at the time point at which said pulse edge of said cylinder identifying signal occurs.

6. A control apparatus for an internal combustion engine according to claim 1,
wherein said cylinder identifying signal contains a pulse for identifying said given one cylinder, the pulse width of said pulse identifying said given one cylinder differs from those of the other pulses for identifying the other engine cylinders.

7. An apparatus for controlling operation of an internal combustion engine, comprising:
first signal detecting means for generating a first signal series in synchronism with rotation of a crank shaft of said internal combustion engine;
second signal detecting means for generating a second signal series in synchronism with rotation of a cam shaft driven at a half speed relative to said crank shaft; and
control means for controlling at least one parameter involved in operation of said internal combustion engine on the basis of at least one of said first and second signal series;
said first signal series including an angular position signal generated at every predetermined angular position of said crank shaft, a first level interval corresponding to a reference position of a specific cylinder group of said engine and a second level interval corresponding to a reference position of another cylinder group and having a polarity differing from that of said first level interval;
said second signal series containing pulses corresponding to said cylinders, respectively, and a cylinder identifying signal for identifying at least a given one of said cylinders, wherein a pulse form of said cylinder identifying signal for said given one cylinder differs from those for the other engine cylinders;
said control means including:
level interval detecting means for detecting said first and second level intervals on the basis of said first signal series;
reference position detecting means for detecting reference positions of said engine cylinders, respectively, on the basis of said angular position signal and said first and second level intervals;
cylinder group identifying means for identifying said cylinder groups on the basis of said first and second level intervals;
cylinder identifying means for discriminatively identifying each of said engine cylinders on the basis of at least said second signal series; and
control timing arithmetic means for arithmetically determining control timings for controlling said at least one parameter on the basis of the results of the cylinder identification performed by said cylinder identifying means and said second signal series;
wherein said cylinder identifying means is so implemented as to measure a time interval during which said cylinder identifying signal is generated on the basis of a count value of the pulses contained in said angular position signal during said time interval, to thereby identify discriminatively the individual engine cylinders from one another on the basis of the results of said measurement.

8. An apparatus for controlling operation of an internal combustion engine, comprising:
first signal detecting means for generating a first signal series in synchronism with rotation of a crank shaft of said internal combustion engine;
second signal detecting means for generating a second signal series in synchronism with rotation of a cam shaft driven at a half speed relative to said crank shaft; and
control means for controlling at least one parameter involved in operation of said internal combustion engine on the basis of at least one of said first and second signal series;
said first signal series including an angular position signal generated at every predetermined angular position of said crank shaft, a first level interval corresponding to a reference position of a specific cylinder group of said engine and a second level interval corresponding to a reference position of another cylinder group and having a polarity differing from that of said first level interval;
said second signal series containing pulses corresponding to said cylinders, respectively, and a cylinder identifying signal for identifying at least a given one of said cylinders, wherein a pulse form of said cylinder identifying signal for said given one cylinder differs from those for the other engine cylinders;
said control means including:
level interval detecting means for detecting said first and second level intervals on the basis of said first signal series;
reference position detecting means for detecting reference positions of said engine cylinders, respectively, on the basis of said angular position signal and said first and second level intervals;
cylinder group identifying means for identifying said cylinder groups on the basis of said first and second level intervals;
cylinder identifying means for discriminatively identifying each of said engine cylinders on the basis of at least said second signal series; and
control timing arithmetic means for arithmetically determining control timings for controlling said at least one parameter on the basis of the results of the cylinder identification performed by said cylinder identifying means and said second signal series;
wherein said cylinder identifying means is so implemented as to identify the individual engine cylinders on the basis of ratios of time intervals during which cylinder identifying signal pulses are generated, respectively.

9. An apparatus for controlling operation of an internal combustion engine, comprising:
first signal detecting means for generating a first signal series in synchronism with rotation of a crank shaft of said internal combustion engine;
second signal detecting means for generating a second signal series in synchronism with rotation of a cam shaft driven at a half speed relative to said crank shaft; and
control means for controlling at least one parameter involved in operation of said internal combustion engine on the basis of at least one of said first and second signal series;
said first signal series including an angular position signal generated at every predetermined angular position of said crank shaft, a first level interval corresponding to a reference position of a specific cylinder group of said engine and a second level interval corresponding to a reference position of another cylinder group and having a polarity differing from that of said first level interval;

said second signal series containing pulses corresponding to said cylinders, respectively, and a cylinder identifying signal for identifying at least a given one of said cylinders, wherein a pulse form of said cylinder identifying signal for said given one cylinder differs from those for the other engine cylinders;

said control means including:

level interval detecting means for detecting said first and second level intervals on the basis of said first signal series;

reference position detecting means for detecting reference positions of said engine cylinders, respectively, on the basis of said angular position signal and said first and second level intervals;

cylinder group identifying means for identifying said cylinder groups on the basis of said first and second level intervals;

cylinder identifying means for discriminatively identifying each of said engine cylinders on the basis of at least said second signal series; and control timing arithmetic means for arithmetically determining control timings for controlling said at least one parameter on the basis of the results of the cylinder identification performed by said cylinder identifying means and said second signal series;

said first signal detecting means including:

a first rotating disk fixedly mounted on said crank shaft co-rotatably therewith, said first rotating disk having an outer peripheral edge formed with a number of teeth projecting radially outwardly from said first rotating disk with a pitch corresponding to said predetermined angle of said crank shaft, a non-toothed segment which extends along the outer periphery of said first rotating disk over a predetermined angular range and in which said teeth are absent, and a continuous protrusion segment formed substantially in diametrical opposition to said non-toothed segment over a predetermined angular range, said continuous protrusion segment having a height differing from that of said non-toothed segment as viewed in the radial direction of said rotating disk; and first sensor means disposed stationarily in opposition to the outer peripheral edge of said first rotating disk for detecting said teeth, said non-toothed segment and said continuous protrusion segment to thereby generate said first signal series containing said angular position signal, said first level interval and said second level interval, respectively;

said second signal detecting means including:

a second rotating disk fixedly mounted on a cam shaft of said engine for co-rotation therewith, said cam shaft being operatively connected to said crank shaft by way of a transmission means and having a half speed relative to said crank shaft, said second rotating disk having an outer peripheral edge formed with a predetermined number of projections extending radially outwardly substantially with angular equi-distance therebetween, at least one of said projections having a length differing from that of the other projections as viewed in a circumferential direction of said second rotating disk, said predetermined number being equal to a number of cylinders of said internal combustion engine; and second sensor means disposed stationarily in opposition to the outer peripheral edge of said second rotating disk for detecting said radial projections to thereby generate said second signal series including said pulses, wherein said pulse for said given one cylinder is generated in response to detection of said at least one projection.

10. A control apparatus for an internal combustion engine according to claim 9, wherein position of a trailing edge of said non-toothed segment as viewed in a rotational direction of said first rotating disk is so selected as to define the reference position for determining control timing for said specific cylinder group including the engine cylinders which can be controlled substantially simultaneously, while position of a trailing edge of said continuous protrusion segment as viewed in a rotational direction of said first rotating disk is so selected as to define the reference position for determining control timing for said other cylinder group including the engine cylinders which can be controlled substantially simultaneously.

11. An apparatus for controlling operation of an internal combustion engine, comprising:

first signal detecting means for generating a first signal series in synchronism with rotation of a crank shaft of said internal combustion engine;

second signal detecting means for generating a second signal series in synchronism with rotation of a cam shaft driven at a half speed relative to said crank shaft; and control means for controlling at least one parameter involved in operation of said internal combustion engine on the basis of at least one of said first and second signal series;

said first signal series including an angular position signal generated at every predetermined angular position of said crank shaft, a first level interval corresponding to a reference position of a specific cylinder group of said engine and a second level interval corresponding to a reference position of another cylinder group and having a polarity differing from that of said first level interval;

said second signal series containing pulses corresponding to said cylinders, respectively, and a cylinder identifying signal for identifying at least a given one of said cylinders, wherein a pulse form of said cylinder identifying signal for said given one cylinder differs from those for the other engine cylinders;

said control means including:

level interval detecting means for detecting said first and second level intervals on the basis of said first signal series;

reference position detecting means for detecting reference positions of said engine cylinders, respectively, on the basis of said angular position signal and said first and second level intervals;

cylinder group identifying means for identifying said cylinder groups on the basis of said first and second level intervals;

cylinder identifying means for discriminatively identifying each of said engine cylinders on the basis of at least said second signal series;

control timing arithmetic means for arithmetically determining control timings for controlling said at least one parameter on the basis of the results of the cylinder identification performed by said cylinder identifying means and said second signal series; and abnormality decision means for generating and outputting an abnormality decision signal to said cylinder identifying means, said cylinder group identifying means and said control timing arithmetic means upon detection of a failure in one of said first and second signal series;

wherein upon detection of occurrence of abnormality in said first signal series by said abnormality decision means, said cylinder identifying means responds to output of said abnormality decision means for thereby identifying said engine cylinders, respectively, on the basis of duty cycles of the pulses contained in said second signal series; and wherein said control timing arithmetic means arithmetically determines the control timings for said engine cylinders, respectively, on the basis of output of said cylinder identifying means.

12. A control apparatus for an internal combustion engine according to claim 11, wherein upon detection of occurrence of abnormality in said second signal series by said abnormality decision means, said cylinder group identifying means responds to the output of said abnormality decision means for thereby identifying said specific cylinder group and the other cylinder group, respectively, on the basis of said level intervals detected by said level interval detecting means, each of said cylinder groups including the cylinders which can be controlled substantially simultaneously; and wherein said control timing arithmetic means arithmetically determines said control timings for said specific and other cylinder groups on the basis of output of said cylinder group identifying means.

* * * * *